United States Patent [19]

Yanagishita et al.

[11] Patent Number: 4,611,679
[45] Date of Patent: Sep. 16, 1986

[54] AIR INTAKE DEVICE FOR MOTOR VEHICLES WITH RIDING SADDLES

[75] Inventors: Masami Yanagishita; Yasunori Ogita, both of Saitama, Japan

[73] Assignee: Honda Giken Kogyo Kabushiki Kaisha, Tokyo, Japan

[21] Appl. No.: 698,462

[22] Filed: Feb. 5, 1985

[30] Foreign Application Priority Data

Feb. 6, 1984 [JP] Japan .................. 59-19670

[51] Int. Cl.$^4$ ............................................. B60K 13/02
[52] U.S. Cl. .................................................. 180/68.3
[58] Field of Search ..................... 55/385 B, DIG. 28; 180/68.3, 219, 225, 229

[56] References Cited

U.S. PATENT DOCUMENTS

| | | | |
|---|---|---|---|
| 4,321,978 | 3/1982 | Tominaga et al. | 180/225 |
| 4,392,536 | 7/1983 | Iwai et al. | 180/217 |
| 4,425,977 | 1/1984 | Michiuchi | 55/385 B |
| 4,461,366 | 7/1984 | Honda | 180/229 |
| 4,475,617 | 10/1984 | Minami et al. | 180/219 |
| 4,484,651 | 11/1984 | Hattori et al. | 180/225 |

FOREIGN PATENT DOCUMENTS

| | | | |
|---|---|---|---|
| 157455 | 11/1939 | Fed. Rep. of Germany | 180/225 |
| 58-169145 | 11/1983 | Japan . | |

Primary Examiner—John J. Love
Assistant Examiner—Richard Camby
Attorney, Agent, or Firm—Armstrong, Nikaido, Marmelstein & Kubovcik

[57] ABSTRACT

An air intake device for a motor vehicle with a riding saddle, having an engine, an air cleaner disposed behind the engine, a tube defining at least a portion of an air intake passage from the air cleaner to the engine, and an exhaust passage extending rearwardly from the engine alongside of the air cleaner. The tube has an end connected to a side of the air cleaner remote from an opposite side thereof along which the exhaust passage extends.

5 Claims, 4 Drawing Figures

4,611,679

AIR INTAKE DEVICE FOR MOTOR VEHICLES WITH RIDING SADDLES

BACKGROUND OF THE INVENTION

The present invention relates to an air intake device for a motor vehicle with a riding saddle, such as a motorcycle, a three-wheeled motor vehicle, or the like.

Motor vehicles with riding saddles or saddle seats for riders include an engine positioned generally in a central position in a longitudinal direction of a vehicle body below a main pipe which is a main component of a vehicle frame. An air cleaner is disposed behind the engine and in front of a rear wheel, and a carburetor is positioned in the vicinity of the engine, the air cleaner and the carburetor being connected by a connecting tube. The connecting tube has an air inlet end coupled to an outlet port defined in a front surface of an air cleaner casing. The connecting tube is located substantially centrally in a transverse direction of the vehicle body. An exhaust pipe extends rearwardly from the engine alongside of the vehicle body.

The foregoing basic layout of various intake and exhaust components for the engine is shared by most of motorcycles and three-wheeled motor vehicles, including off-road motorized cycles such as moto-crossers or trail motorbikes, for example. In the off-road motor vehicles, the exhaust pipe generally extends rearwardy from the engine at a position away from the ground and close to a lower surface of the saddle seat to avoid interference with objects on the ground. This exhaust pipe arrangement has a problem in that where a muffler connected to the exhaust pipe is positioned laterally of the air cleaner, the heat generated by the muffler tends to adversely affect the connecting tube which is part of an air intake path of the engine. More specifically, when the temperature of air drawn by the air intake path is caused to rise by the heat of the muffler, the air is expanded in volume and mixed with fuel in the carburetor, the air-fuel mixture being then introduced into an engine cylinder, with the result that the volumetric efficiency ($\epsilon_v$) of the engine is decreased. The off-road motor vehicle requires its air cleaner to have a higher air cleaning capacity as compared with the on-road motor vehicle. With the foregoing conventional arrangement of components, the outlet port for supplying cleaned air from the air cleaner is defined in the front surface of the air cleaner casing. Where a cleaner element is cylindrical in shape, the axis thereof is directed longitudinally of the vehicle body, and the area of the cleaner element effective for cleaning air cannot be increased since the cleaner casing is narrow in the transverse direction of the vehicle body, making it difficult to increase the diameter of the cylindrical cleaner element.

SUMMARY OF THE INVENTION

With the above prior problems in view, it is an object of the present invention to provide an air intake device for vehicles with riding saddles, which is arranged to prevent a connecting tube from being adversely affected by the heat of a muffler, thereby maintaining a prescribed volumetric efficiency of the engine, in the case where the muffler connected to an exhaust pipe is positioned laterally of an air cleaner.

Another object of the present invention is to provide an air intake device for vehicles with riding saddles, in which the air cleaning ability of an air cleaner can be increased easily and effectively.

To achieve the above objects, there is provided in accordance with the present invention an air intake device for a motor vehicle with a riding saddle, having a vehicle frame including a head pipe and a main pipe extending rearwardly from the head pipe, an engine mounted on the vehicle frame below the main pipe, an air cleaner disposed behind the engine adjacent to a rear end of the main pipe, a tube defining at least a portion of an air intake passage from the air cleaner to the engine, and an exhaust passage extending rearwardly from the engine alongside of the air cleaner, the improvement comprising the tube having an end connected to a side of the air cleaner remote from an opposite side thereof along which the exhaust passage extends.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
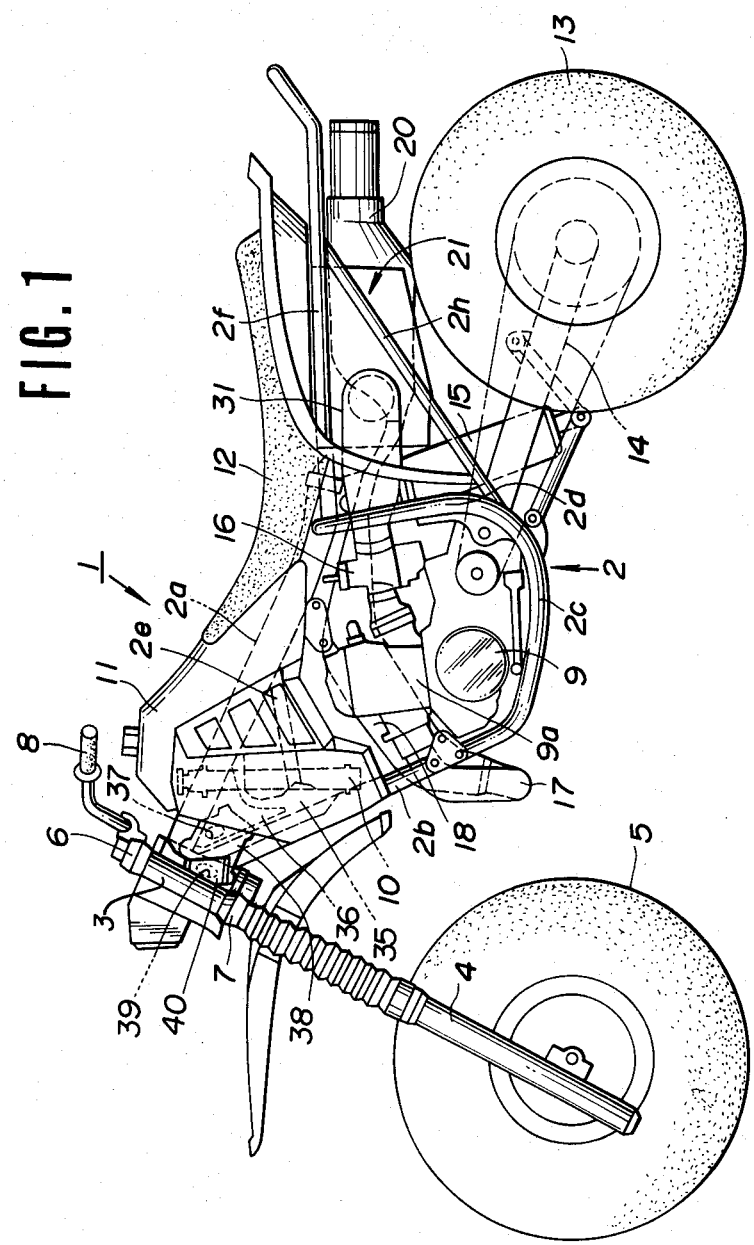
FIG. 1 is a side elevational view of a three-wheeled motor vehicle with a riding saddle in which the present invention can be incorporated.

As shown in FIG. 1, a three-wheeled motor vehicle 1 includes a vehicle frame 2 composed of a front head pipe 3 on which a front fork 4 supporting a front wheel 5 is steerably supported through upper and lower bridges 6, 7. A bar handle 8 is mounted on the upper bridge 6.

The vehicle frame 2 comprises a main pipe 2a extending rearwardly from an upper portion of the head pipe 3, a downward pipe 2b extending downwardly from a lower portion of the head pipe 3, a pair of laterally spaced lower pipes 2c extending rearwardly from a rear end of the down pipe 2b, and a pair of laterally spaced central pipes 2d extending upwardly from rear ends of the lower pipes 2c and joined to a rear portion of the main pipe 2a. The main pipe 2a, the downward pipe 2b, the lower pipes 2c, and the central pipes 2d surround a space in which a water-cooled engine 9 is mounted. A tension pipe 2e extends between the main pipe 2a and the downward pipe 2b above and forward of the engine 9, the tension pipe 2e supporting a radiator 10. A fuel tank 11 is disposed astride of the main pipe 2a above the engine 9.

A pair of laterally spaced seat pipes 2f extends rearwardly from upper portions of the central pipes 2d and serves as a pair of seat rails. The seat pipes 2f are coupled at rear ends thereof to each other by a cross member 2g. A riding saddle or saddle seat 12 is mounted on the seat pipes 2f. Rear pipes 2h are disposed between the rear ends of the seat pipes 2f and lower portions of the central pipes 2d. A swing-arm rear fork 14 is pivotally mounted on and extends rearwardly from the lower portions of the central pipes 2d, the rear fork 14 supporting a pair of laterally spaced rear wheels 13, 13. A rear cushioning unit 15 is interposed between the rear fork 14 and the rear end of the main pipe 2a and has a lower end coupled through a link mechanism to the rear fork 14. The rear cushioning unit 15 has progressive characteristics in which dampening forces produced thereby increase progressively as the rear wheels 13 swing vertically.

Figure 2:
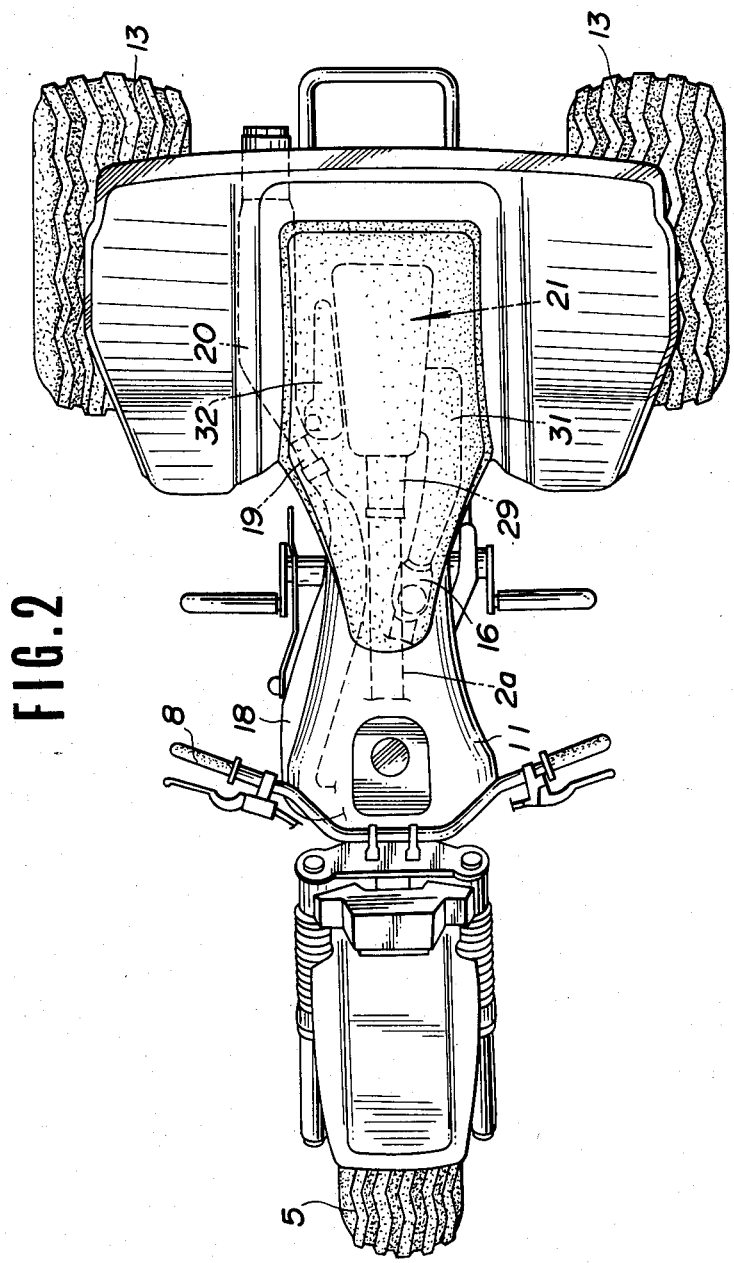
FIG. 2 is a plan view of the three-wheeled motorcycle shown in FIG. 1.

A carburetor 16 is disposed behind a cylinder 9a of the engine 9. As illustrated in FIG. 2, an exhaust pipe 17 extending from the cylinder 9a is connected to a main muffler 18 positioned on the righthand side of the vehicle frame. The main muffler 18 is connected by a pipe 19 to a submuffler 20 which extends rearwardly on the righthand side of an air cleaner 21 located below the saddle seat 12 behind the main pipe 2a.

Figure 3:
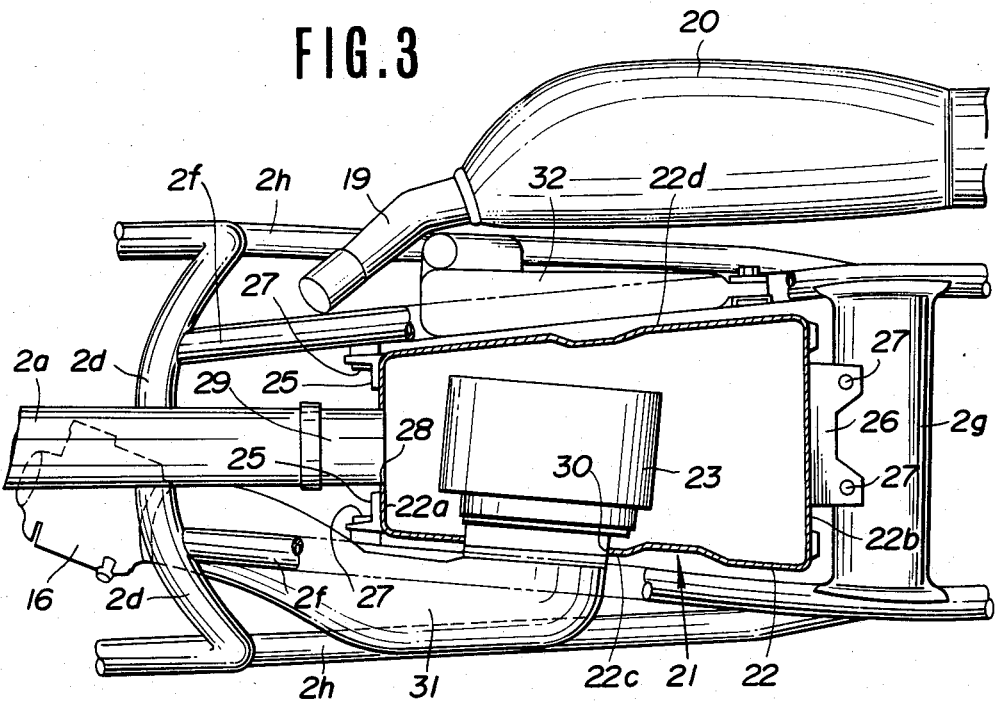
FIG. 3 is an enlarged fragmentary plan view of a rear vehicle body portion, showing an air intake device according to the present invention.
Figure 4:
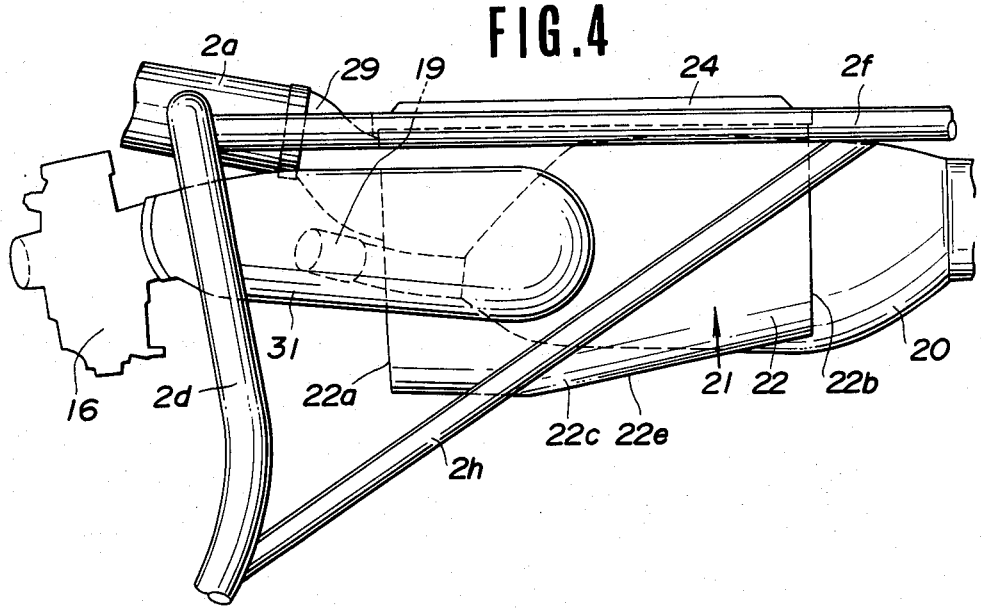
FIG. 4 is a side elevational view of the parts shown in FIG. 3.

As illustrated in FIGS. 3 and 4, the air cleaner 21 is composed of a casing 22 and a cleaner element 23 disposed therein. The casing 22 is in the form of a box composed of a front panel 21a, a rear panel 22b, a pair of spaced side panels 22c, 22d, a bottom panel 22e, and a cover 24 closing an upper opening of the casing 22. The casing 22 is elongate in the longitudinal direction of the motor vehicle and has a width progressively greater in a rearward direction so that the casing 22 is fitted in a space between the seat pipes 2f. The casing 22 also has upper lateral brackets 25, 25 on the front panel 22a and an upper central bracket 26 on the rear panel 22b, the brackets 25, 26 being fastened by bolts 27 to the seat pipes 2f and the cross member 2g. The front panel 22a of the air cleaner casing 22 has an opening 28 as an air inlet port opening on an outer dirty side of the cleaner element 23. The opening 28 and a rear opening of the main pipe 2a are interconnected by a tube 29.

The main pipe 2a has a plurality of openings (not shown) defined in a front lower surface thereof. Between the front end of the main pipe 2a and the front end of the downward pipe 2b, there are disposed a pair of lateral gusset plates 35 defining therebetween an air chamber 36 communicating with the interior of the main pipe 2a through the openings in the front lower surface thereof. Each of the gusset plates 35 has an inlet port 37 defined in a front portion thereof and opening into the air chamber 36. A cover 38 for the inlet port 37 is attached to the gusset plate 35 in spaced relation thereto. The cover 38 has an air intake port 39 defined in a front portion thereof and opening toward an inner surface of an air guide 40 having open front and rear ends. Thus, ambient air introduced from the air intake port 39 flows along the inner surface of the cover 38, and through the inlet port 37 and the air chamber 36 into the main pipe 2b, which serves as an air duct to guide the air into the air cleaner casing 22.

The air cleaner element 23 is of a cylindrical shape having an axis extending perpendicularly to a longitudinal axis of the air cleaner casing 22. The lefthand side panel 22c (FIG. 3) has an opening 30 serving as an air outlet port to which there is connected an end of a connecting tube 31 interconnecting an inner clean side of the cleaner element 23 and the carburetor 16. The connecting tube 31 extends forwardly alongside of the side panel 22c and has an opposite end coupled to the carburetor 16. The connecting tube 31 is thus disposed on a side of the air cleaner casing 22 remote from the submuffler 20.

A radiator subtank 32 is interposed between the air cleaner casing 22 and the submuffler 20 and contains water for absorbing the heat given off by the submuffler 20 to thereby shield the air cleaner casing 22 from the heat.

Air introduced through the air duct of the main pipe 2a and the opening 28 in the front panel 22a of the air cleaner casing 22 is drawn into the air cleaner element 23 from its outer dirty side and then cleaned by the air cleaner element 23. The cleaned air is thereafter delivered from the inner clean side of the air cleaner element 23 through the connecting tube 31 connected to the opening 30 in the side panel 22c into the carburetor 16, in which the air is mixed with fuel. The air-fuel mixture is then supplied from the carburetor 16 into the engine cylinder 9a.

Since the connecting tube 31 serving as an air passage from the air cleaner casing 22 to the carburetor 16 is positioned remotely or sufficiently spaced from the submuffler 20 with the air cleaner casing 22 interposed, the connecting tube 31 is substantially free from any thermal influence from the submuffler 20. Therefore, the air supplied through the connecting tube 31 to the carburetor 16 is prevented from being heated and expanded in volume, with the result that a desired volumetric efficiency can be maintained for the engine 9.

With the foregoing arrangement, the connecting tube 31 by which the clean side of the air cleaner element 23 and the carburetor 16 are interconnected is connected to the opening 30 in the side panel 22c of the air cleaner casing 22, and the cylindrical element 23 is oriented in the air cleaner 22 such that its axis is aligned with the transverse direction of the vehicle frame. Therefore, where the air cleaner casing 22 is of a reduced width or the air cleaner element 23 requires an air cleaning area greater than a certain level, a required air cleaning area can be obtained more effectively without increasing the size of the air cleaner element 23 than would be if the connecting tube 31 were coupled to the front panel 22a of the air cleaner casing 22.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. An air intake device for a motor vehicle with a riding saddle, having a vehicle frame including a head pipe and a main pipe extending rearwardly from said head pipe and having a rear end, an engine mounted on said vehicle frame below said main pipe, an air cleaner disposed behind said engine adjacent to said rear end of said main pipe, a tube defining at least a portion of an air intake passage from said air cleaner to said engine, and an exhaust passage extending rearwardly from said engine in substantially the same horizontal plane and alongside of said air cleaner, the improvement comprising said tube having an end connected to a lateral side of said air cleaner remote from an opposite side thereof along which said exhaust passage extends and said air cleaner has an air inlet on a side thereof facing said rear end of said main tube.

2. An air intake device according to claim 1, wherein said air cleaner comprises an air cleaner casing and a cylindrical cleaner element disposed in said air cleaner casing, said cleaner element having a horizontal axis extending perpendicularly to a longitudinal axis of said air cleaner casing.

3. An air intake device according to claim 1, wherein said exhaust passage includes a muffler positioned laterally of said air cleaner.

4. An air intake device according to claim 1, wherein said engine comprises a water-cooled engine, including a radiator disposed forwardly of said engine, and a subtank for said radiator, laterally interposed between said air cleaner and a portion of said exhaust passage closest to said air cleaner.

5. An air intake device according to claim 1, wherein said main pipe defines an air duct therein for introducing air, said main pipe having said rear end connected to said air cleaner.

* * * * *